US011358380B2

(12) United States Patent
Bommaraju et al.

(10) Patent No.: US 11,358,380 B2
(45) Date of Patent: Jun. 14, 2022

(54) METHODS AND APPARATUS FOR MOLDING-IN GASKETS WITHIN THE GROOVES OF A PLANAR WORK MATERIAL

(71) Applicant: Lumvatech, LLC, Williamston, SC (US)

(72) Inventors: Chakrapani Bommaraju, Houston, TX (US); Aaron Meltzer, Anderson, SC (US); Mathew Bobinski, Anderson, SC (US)

(73) Assignee: Lumvatech, LLC, Pelzer, SC (US)

( * ) Notice: Subject to any disclaimer, the term of this patent is extended or adjusted under 35 U.S.C. 154(b) by 401 days.

(21) Appl. No.: 15/252,582

(22) Filed: Aug. 31, 2016

(65) Prior Publication Data

US 2020/0070490 A1 Mar. 5, 2020
US 2021/0122150 A9 Apr. 29, 2021

Related U.S. Application Data

(60) Provisional application No. 62/212,621, filed on Sep. 1, 2015.

(51) Int. Cl.
*B32B 29/00* (2006.01)
*B32B 37/26* (2006.01)
(Continued)

(52) U.S. Cl.
CPC .............. *B32B 37/26* (2013.01); *B29C 43/34* (2013.01); *B29C 66/0044* (2013.01);
(Continued)

(58) Field of Classification Search
CPC ..... F21V 11/16; G02B 6/0016; G02B 6/0036; G02B 6/0038; G02B 6/0055;
(Continued)

(56) References Cited

U.S. PATENT DOCUMENTS 6,490,819 B1 * 12/2002 Kumata .................. G09F 13/16
40/208
9,568,651 B2 * 2/2017 Tsuji ..................... G02B 5/0278
(Continued)

FOREIGN PATENT DOCUMENTS

JP WO 2014/103343 * 7/2014 ......... G06F 21/6245

*Primary Examiner* — Zheng Song
(74) *Attorney, Agent, or Firm* — JK Intellectual Property Law, PA

(57) ABSTRACT

Exemplary embodiments of the present disclosure are directed towards methods and apparatus for molding-in gaskets that serve as light blockers, within the grooves of a moving planar work material. The gaskets comprise of a hot melt adhesive material that is in a molten state above a particular temperature and gets solidified below a particular temperature. Another exemplary embodiment of the present disclosure is directed towards a planar work material having grooves that are filled with molded-in gaskets, wherein the gaskets are made up of a hot melt adhesive material. The gaskets made of the hot melt adhesive material bond securely with the panels because of inherent adhesive properties, and provide structural stability to the light panels. Another exemplary embodiment of the present disclosure is directed towards the use of a hot melt adhesive material as the molding material for molding-in gaskets within the grooves of a planar work material.

30 Claims, 7 Drawing Sheets

(51) Int. Cl.
*F21V 11/16* (2006.01)
*B32B 37/00* (2006.01)
*B29C 43/34* (2006.01)
*B29C 65/00* (2006.01)
*B29L 31/26* (2006.01)

(52) U.S. Cl.
CPC ........ *B32B 29/002* (2013.01); *B32B 37/0053* (2013.01); *F21V 11/16* (2013.01); *B29C 2043/3422* (2013.01); *B29L 2031/265* (2013.01); *B32B 2037/268* (2013.01)

(58) Field of Classification Search
CPC ...... G02B 6/0058; G02B 6/006; G02B 5/003; B29C 2043/3422; B29C 43/18; B29C 43/34; B29C 43/38; B29C 43/46; B29C 43/52; B29C 66/0044; B29L 2031/265; B29L 2031/747; B32B 2037/268; B32B 2250/03; B32B 2250/05; B32B 2250/40; B32B 2255/12; B32B 2255/26; B32B 2457/00; B32B 27/10; B32B 27/36; B32B 27/365; B32B 29/002; B32B 3/30; B32B 37/0053; B32B 37/26; B32B 7/06; B32B 7/12

See application file for complete search history.

(56) References Cited

U.S. PATENT DOCUMENTS

| | | | |
|---|---|---|---|
| 2004/0047042 A1* | 3/2004 | Takahashi | G02B 6/0051 359/599 |
| 2007/0030414 A1* | 2/2007 | Chang | G02F 1/133611 349/62 |
| 2007/0268586 A1* | 11/2007 | Mimura | G02B 5/003 359/599 |
| 2008/0186558 A1* | 8/2008 | Lee | G02B 6/04 359/227 |
| 2009/0168457 A1* | 7/2009 | Lai | F21S 8/00 362/618 |
| 2013/0170805 A1* | 7/2013 | McBroom | G01T 1/1644 385/129 |
| 2014/0146563 A1* | 5/2014 | Watanabe | G02B 6/0043 362/606 |
| 2017/0108628 A1* | 4/2017 | Larsen | G02B 1/04 |

* cited by examiner

METHODS AND APPARATUS FOR MOLDING-IN GASKETS WITHIN THE GROOVES OF A PLANAR WORK MATERIAL

TECHNICAL FIELD

The present disclosure generally relates to the field of backlighting. In particular, the present disclosure relates to methods and apparatus for molding-in gaskets that serve as light blockers within the grooves of light panels. The present disclosure also relates to a light panel with gaskets positioned within the grooves, wherein the gaskets are made up of a hot melt adhesive material.

BACKGROUND

The backlighting industry uses transparent/translucent materials such as polyethylene terephthalate (PETE), polycarbonate (PC) and polymethyl methacrylate (PMMA) in the manufacturing of light panels. These light panels act as the medium to channel light from a source. However, the light emitted from the source gets distributed throughout the panel and such a distribution is unwarranted. In order to meet customer specifications, light should be channeled only to specific areas in the panel. For this purpose, manufacturers use opaque gaskets that act as light blockers at specific locations. The standard industry practice is to make grooves in the light panels and place the gaskets made out of rubber/plastic based materials in those grooves. However, the conventional processes of positioning the gaskets within the grooves are time consuming, error prone and not cost effective. In addition, the gaskets may fall off during shipping and handling of the light panels as the gaskets are not positioned securely.

In the light of aforementioned discussion, there exists a need for methods to securely position the gaskets within the grooves of the light panels in a cost effective and efficient manner. The present invention relates to methods and apparatus for molding-in the gaskets within the grooves of the light panels in a cost-effective and efficient manner. The present disclosure also relates to light panels with gaskets molded-in within the grooves, wherein the gaskets are made up of a hot melt adhesive material. The gaskets made of the hot melt adhesive material bond securely with the panels because of inherent adhesive properties, and provide structural stability to the light panels.

BRIEF SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Exemplary embodiments of the present disclosure are directed towards apparatus for molding-in gaskets within the grooves of moving planar work materials. In a particular embodiment, the planar work material having one or more grooves of predetermined shape is a light panel affixed with a precut covering sheet. The apparatus comprises of a frame and a moving means configured to move the planar work material at a regulated speed. The frame has an infeed end disposed at the front configured to receive the planar work material and an outfeed end disposed at the back configured to dispense the planar work material. The frame comprises of one or more pairs of compression rollers and a dispensing means for holding and dispensing a molten gasket material. In a particular embodiment, the frame further comprises of a heating means to keep a molten gasket material in a molten state. The elongated cylindrical compression rollers are disposed between the infeed end and the outfeed end. The compression rollers of a pair are pivotally mounted to the frame one above another having an adjustable gap in between for letting the planar work material pass through. The pair of compression rollers have parallel axes and are rotatably driven in opposite directions by a driving means. The pair of compression rollers are configured to rotatably advance the planar work material from the infeed end to the outfeed end through the gap and to come together at a line of contact during the operation of the apparatus thereby exerting sufficient pressure on the planar work material to flatten and smooth the creases and ridges formed by the excess molten gasket material. The dispensing means has one or more openings for dispensing the molten gasket material within the grooves of the planar work material. In a particular embodiment, the molten gasket material is a hot melt adhesive material. The dispensing means is mounted at the front of the frame by supporting means. In a particular embodiment, the supporting means is a pair of supporting arms. The dispensing means is positioned ahead of the pair of compression rollers in an elevated position so that the molten gasket material is dispensed into the groove of the work material before being fed into the gap between the compression rollers. The moving means has an infeed unit and an outfeed unit. The infeed unit is disposed adjacent to the infeed end and configured to support and move the planar work material during dispensation of the molten gasket material. The infeed unit further feeds the planar work material to the infeed end. The outfeed unit is disposed adjacent to the outfeed end and configured to receive and support the planar work material dispensed from the outfeed end and to move the planar work material away from the outfeed end.

Another exemplary embodiment of the present disclosure is directed towards an apparatus as described above further comprising a foil web dispensing roller unit that is configured to hold and dispense a foil web by means of a plurality of rollers and the dispensed foil web is configured to cover the moving planar work material on a top surface and a lower surface after the grooves in the work material are filled with the hot melt adhesive material. The foil web dispensing unit is comprised of an upper unit and a lower unit and disposed between the infeed end and the outfeed end. In a particular embodiment, the upper unit has an upper web roller disposed at an elevated position adjacent to the upper compression roller. The upper unit is configured to hold and rotatably dispense a foil web through the upper compression roller to cover a top surface of the planar work material. The lower unit has a lower web roller disposed beneath and adjacent to the lower compression roller. It is configured to hold and rotatably dispense a foil web through the lower compression roller to cover a lower surface of the planar work material filled with the molten gasket material. In embodiments where there are more than a pair of compression rollers, the foil web is dispensed from the web rollers to the front pair of the compression rollers that are adjacent to the infeed end and thus receive the planar work material.

Another exemplary embodiment of the present disclosure is directed towards a method for molding-in gaskets within the grooves of a moving planar work material. The method starts with the step of providing the apparatus for molding-in gaskets within the grooves of a moving planar work material as described above. This is followed by providing the planar work material having one or more grooves which is supported and advanced by the infeed unit of the moving means. In a particular embodiment, the planar work material having one or more grooves of predetermined shape is a light panel. Then, a molten gasket material is dispensed through the opening within the groove thus filling the groove with the molten gasket material. In a particular embodiment, the molten gasket material is a hot melt adhesive material. Then this planar work material with filled-in grooves is advanced towards the infeed end and then through the gap between the compression rollers. The pair of compression rollers come together at the line of contact thereby rotatably advancing the planar work material and exerting sufficient pressure on the planar work material to flatten and smooth the creases and ridges formed by the excess molten gasket material. The work material is further advanced through the frame towards the outfeed end. Then the work material dispensed from the outfeed end onto the moving means is collected. The dispensed work material has groove(s) with solidified gasket(s).

Another exemplary embodiment of the present subject matter is directed towards a method for molding-in gaskets within the grooves of a moving planar work material. The method starts with the step of providing the apparatus for molding-in gaskets within the grooves of a moving planar work material as described above. This is followed by providing the planar work material having one or more grooves which is supported and advanced by the infeed unit of the moving means. In a particular embodiment, the planar work material having one or more grooves of predetermined shape is a light panel. Then, a molten gasket material is dispensed through the opening within the groove thus filling the groove with the molten gasket material. In a particular embodiment, the molten gasket material is a hot melt adhesive material. Then this planar work material with filled-in grooves is advanced towards the infeed end and then through the gap between the front pair of compression rollers. Then the work material comes in contact with the foil dispensed by the foil web dispensing roller unit at the line of contact of the front pair of the compression rollers. The top surface and the lower surface of the planar work material are covered by the foil dispensed by the upper unit and the lower unit respectively. The front upper and lower compression rollers come together at the line of contact thereby rotatably advancing the planar work material and exerting sufficient pressure on the planar work material to flatten and smooth the creases and ridges formed by the excess molten gasket material. Then the work material is further advanced through the gap between the rear pair of compression rollers. The rear upper and lower compression rollers come together at the line of contact thereby rotatably advancing the planar work material and exerting sufficient pressure on the planar work material to flatten and smooth the creases and ridges formed by the excess molten gasket material. Then the work material dispensed from the outfeed end onto the moving means is collected, wherein the groove of the work material has a solidified gasket. The dispensed work material has groove(s) with solidified gasket(s) and foil cover on both the surfaces.

Another exemplary embodiment of the present subject matter is directed towards a planar work material comprising one or more grooves having a solidified gasket. The solidified gasket is obtained by first filling the groove with a molten gasket material followed by forwarding the planar work material through one or more of a pair of compression rollers and letting the molten gasket material cure and solidify within the groove. In a particular embodiment, the planar work material having one or more grooves of predetermined shape is a light panel. In a particular embodiment, the molten gasket material is a hot melt adhesive material.

It is an object of the present invention to disclose methods and apparatus for molding-in gaskets within the grooves of a moving planar work material such as light panels. Here a molten gasket material is dispensed within the grooves of a moving planar work material, compressed by mechanical means and allowed to cure and solidify within the groove.

It is another object of the present invention to disclose methods and apparatus that securely position the gaskets within the grooves of the light panels in a cost effective and efficient manner.

It is another object of the present invention to disclose light panels with gaskets made up of a hot melt adhesive material. The gaskets made of the hot melt adhesive material bond securely with the panels because of inherent adhesive properties, and provide structural stability to the light panels.

BRIEF DESCRIPTION OF DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAILED DESCRIPTION

Figure 1:
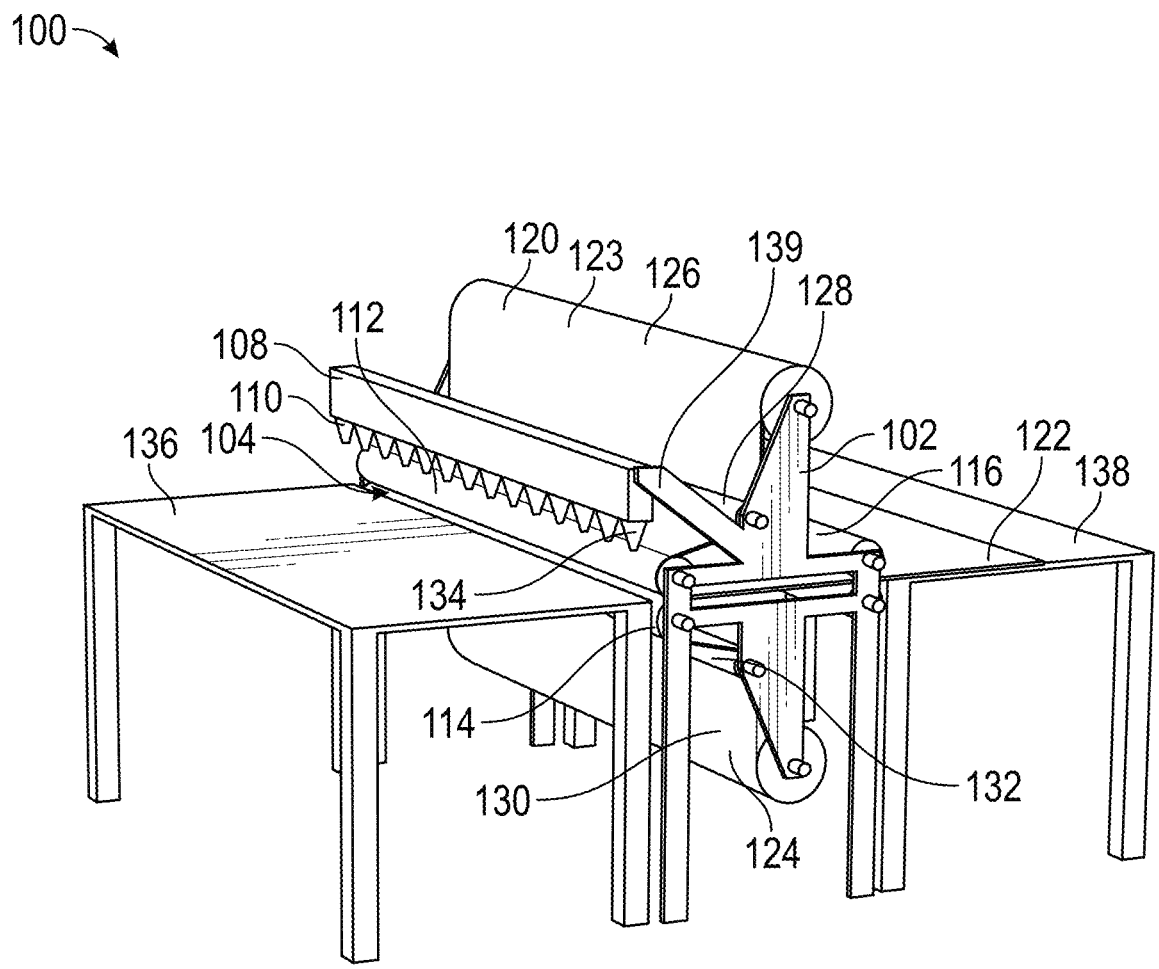
FIG. 1 is a schematic representation of an isometric view of an apparatus 100 for molding-in gaskets within the grooves of a moving planar work material, in accordance with a non-limiting exemplary embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

According to different non limiting exemplary embodiments of the present disclosure, methods for molding-in gaskets within the grooves of a moving planar work material are disclosed.

In accordance with non limiting exemplary embodiments of the present subject matter, apparatus for molding-in gaskets within the grooves of a moving planar work material are disclosed.

According to a non limiting exemplary embodiment of the present disclosure, a planar work material comprising one or more grooves having solidified gaskets is disclosed, wherein the solidified gaskets are obtained by molding-in the gasket material.

In accordance with a non limiting exemplary embodiment of the present disclosure, the gasket material comprises of a hot melt adhesive material that is in a molten state above a particular temperature and gets solidified below a particular temperature. Any other polymer material known in the art that can serve as a light blocker in solidified form and that can be dispensed in a molten state within the grooves of the planar work material to cure and solidify within the grooves can be used as the gasket material without limiting the scope of the present disclosure. In different embodiments, other than the base polymers, the gasket materials further comprise of any one or more of additives such as tackifying resins, waxes, plasticizers, antioxidants, stabilizers, pigments, fillers, and etc to obtain certain desirable properties.

In accordance with a non-limiting exemplary embodiment of the present subject matter, the planar work material is a light panel used in the backlighting industry, wherein the light panel is a plastic polymer. In a particular embodiment, the plastic polymer is either PC, PETE or PMMA material.

According to a non-limiting exemplary embodiment of the present disclosure, the groove present in the planar work material is an open groove that is cut through the work material. The present invention applies to work material having at least one of a groove. The grooves are of predetermined shape and dimensions.

In accordance with a particular non-limiting exemplary embodiment of the present disclosure, the planar work material comprises of a light panel affixed with pre-cut covering sheets on both the planar surfaces. The pre-cut covering sheets completely cover the light panel except at the grooves that are cut through the light panel. The cuts in the covering sheets correspond to the shape and dimensions of the groove in the light panel. The covering sheets are affixed to the planar surfaces of the work material by any adhesive means. In a particular embodiment, the pre-cut covering sheets are kraft paper sheets though any other covering sheet known in the art that can be affixed over the planar work material and that can protect the planar work material from dust and scratches can be used without limiting the scope of the present disclosure.

The term "hot melt adhesive material" used in the present disclosure refers to a group of polymers that melt into liquids at higher temperature and solidify upon cooling. For the present invention, ethylene-vinyl acetate group of polymers are the most preferred group of hot melt adhesives. In different embodiments, other than the base polymers, the hot melt adhesives further comprise of any one or more of additives such as tackifying resins, waxes, plasticizers, antioxidants, stabilizers, pigments, fillers, and etc to obtain certain desirable properties.

The term "gasket" used in the present disclosure refers to objects that are opaque and serve as light blockers within the grooves of the planar work material.

The term "molding-in" used in the present disclosure, refers to the process of dispensing a molten gasket material into a groove of a planar work material followed by curing the gasket material so that it solidifies and thus forms a gasket corresponding to the shape and dimensions of the groove.

The curing process of the gasket material can be drying, thermal curing, chemical curing, curing by solvent evaporation or by any other curing method known in the art that results in the solidification of the gaskets without limiting the scope of the present disclosure. According to the kind of curing process used, the gasket material will further comprise of additives known in the art that aid in the curing process without limiting the scope of the present disclosure.

According to a non-limiting exemplary embodiment of the present disclosure, use of a hot melt adhesive material as the molding material for molding-in gaskets within the grooves of a planar work material is disclosed. In a particular embodiment, such gaskets act as light blockers in a light panel.

In accordance with a non limiting exemplary embodiment of the present subject matter, apparatus for molding-in gaskets within the grooves of a moving planar work material is disclosed. In a particular embodiment, the planar work material having one or more grooves of predetermined shape is a light panel affixed with a precut covering sheet. The apparatus comprises of a frame and a moving means configured to move the planar work material at a regulated speed. The frame has an infeed end disposed at the front configured to receive the planar work material and an outfeed end disposed at the back configured to dispense the planar work material. The frame comprises of one or more pairs of compression rollers and a dispensing means for holding and dispensing a molten gasket material. In a particular embodiment, the frame further comprises of a heating means to keep a molten gasket material in a molten state. The elongated cylindrical compression rollers are disposed between the infeed end and the outfeed end. The compression rollers of a pair are pivotally mounted to the frame one above another having an adjustable gap in between for letting the planar work material pass through. The pair of compression rollers have parallel axes and are rotatably driven in opposite directions by a driving means. The pair of compression rollers are configured to rotatably advance the planar work material from the infeed end to the outfeed end through the gap and to come together at a line of contact during the operation of the apparatus thereby exerting sufficient pressure on the planar work material to flatten and smooth the creases and ridges formed by the excess molten gasket material. The dispensing means has one or more openings for dispensing the molten gasket material within the grooves of the planar work material. In a particular embodiment, the molten gasket material is a hot melt adhesive material. The dispensing means is mounted at the front of the frame by supporting means. In a particular embodiment, the supporting means is a pair of supporting arms. The dispensing means is positioned ahead of the pair of compression rollers in an elevated position so that the molten gasket material is dispensed into the groove of the work material before being fed into the gap between the compression rollers. In a particular embodiment, the dispensing means has a storing means integrated with it that is configured for storing the molten gasket material for dispensation. The moving means has an infeed unit and an outfeed unit. The infeed unit is disposed adjacent to the infeed end and configured to support and move the planar work material during dispensation of the molten gasket material. The infeed unit further feeds the planar work material to the infeed end. The outfeed unit is disposed adjacent to the outfeed end and configured to receive and support the planar work material dispensed from the outfeed end and to move the planar work material away from the outfeed end.

According to a non limiting exemplary embodiment of the present disclosure, an apparatus as described above further comprising a foil web dispensing roller unit is disclosed. The foil web dispensing roller unit is configured to hold and dispense a foil web by means of a plurality of rollers and the dispensed foil web is configured to cover the moving planar work material on a top surface and a lower surface after the grooves in the work material are filled with the hot melt adhesive material. The foil web dispensing unit is comprised of an upper unit and a lower unit and disposed between the infeed end and the outfeed end. In a particular embodiment, the upper unit has an upper web roller disposed at an elevated position adjacent to the upper compression roller. The upper unit is configured to hold and rotatably dispense a foil web through the upper compression roller to cover a top surface of the planar work material. The lower unit has a lower web roller disposed beneath and adjacent to the lower compression roller. It is configured to hold and rotatably dispense a foil web through the lower compression roller to cover a lower surface of the planar work material filled with the molten gasket material. In embodiments where there are more than a pair of compression rollers, the foil web is dispensed from the web rollers to the front pair of the compression rollers that are adjacent to the infeed end and thus receive the planar work material.

In accordance with a non limiting exemplary embodiment of the present subject matter, a method for molding-in gaskets within the grooves of a moving planar work material is disclosed. The method starts with the step of providing the apparatus for molding-in gaskets within the grooves of a moving planar work material as described above. This is followed by providing the planar work material having one or more grooves which is supported and advanced by the infeed unit of the moving means. In a particular embodiment, the planar work material having one or more grooves of predetermined shape is a light panel. Then, a molten gasket material is dispensed through the opening within the groove thus filling the groove with the molten gasket material. In a particular embodiment, the molten gasket material is a hot melt adhesive material. Then this planar work material with filled-in grooves is advanced towards the infeed end and then through the gap between the compression rollers. The pair of compression rollers come together at the line of contact thereby rotatably advancing the planar work material and exerting sufficient pressure on the planar work material to flatten and smooth the creases and ridges formed by the excess molten gasket material. The work material is further advanced through the frame towards the outfeed end. Then the work material dispensed from the outfeed end onto the moving means is collected. The dispensed work material has groove(s) with solidified gasket(s).

According to non limiting exemplary embodiments of the present disclosure, a method for molding-in gaskets within the grooves of a moving planar work material is disclosed. The method starts with the step of providing the apparatus for molding-in gaskets within the grooves of a moving planar work material as described above. This is followed by providing the planar work material having one or more grooves which is supported and advanced by the infeed unit of the moving means. In a particular embodiment, the planar work material having one or more grooves of predetermined shape is a light panel. Then, a molten gasket material is dispensed through the opening within the groove thus filling the groove with the molten gasket material. In a particular embodiment, the molten gasket material is a hot melt adhesive material. Then this planar work material with filled-in grooves is advanced towards the infeed end and then through the gap between the front pair of compression rollers. Then the work material comes in contact with the foil dispensed by the foil web dispensing roller unit at the line of contact of the front pair of the compression rollers. The top surface and the lower surface of the planar work material is covered by the foil dispensed by the upper unit and the lower unit respectively. The front upper and lower compression rollers come together at the line of contact thereby rotatably advancing the planar work material and exerting sufficient pressure on the planar work material to flatten and smooth the creases and ridges formed by the excess molten gasket material. Then the work material is further advanced through the gap between the rear pair of compression rollers. The rear upper and lower compression rollers come together at the line of contact thereby rotatably advancing the planar work material and exerting sufficient pressure on the planar work material to flatten and smooth the creases and ridges formed by the excess molten gasket material. Then the work material dispensed from the outfeed end onto the moving means is collected, wherein the groove of the work material has a solidified gasket. The dispensed work material has groove(s) with solidified gasket(s) and foil cover on both the surfaces.

The dispensing means can dispense the molten gasket material by injecting, squeegee method, pouring, rolling, laminating or any other suitable dispensation method known in the art that can dispense the molten gasket material within the grooves of the planar work material without limiting the scope of the present disclosure. In some embodiments, the dispensing means can also serve as the storing means configured to store the gasket material.

In accordance with a non limiting exemplary embodiment of the present subject matter, a planar work material comprising one or more grooves having a solidified gasket is disclosed. The solidified gasket is obtained by first filling the groove with a molten gasket material followed by forwarding the planar work material through a pair of compression rollers and letting the molten gasket material cure and solidify within the groove. In a particular embodiment, the planar work material having one or more grooves of predetermined shape is a light panel. In a particular embodiment, the molten gasket material is a hot melt adhesive material.

Referring to FIG. 1, it is a schematic representation of an isometric view of an apparatus 100 for molding-in gaskets within the grooves of a moving planar work material, in accordance with a non-limiting exemplary embodiment of the present disclosure.

Figure 2:
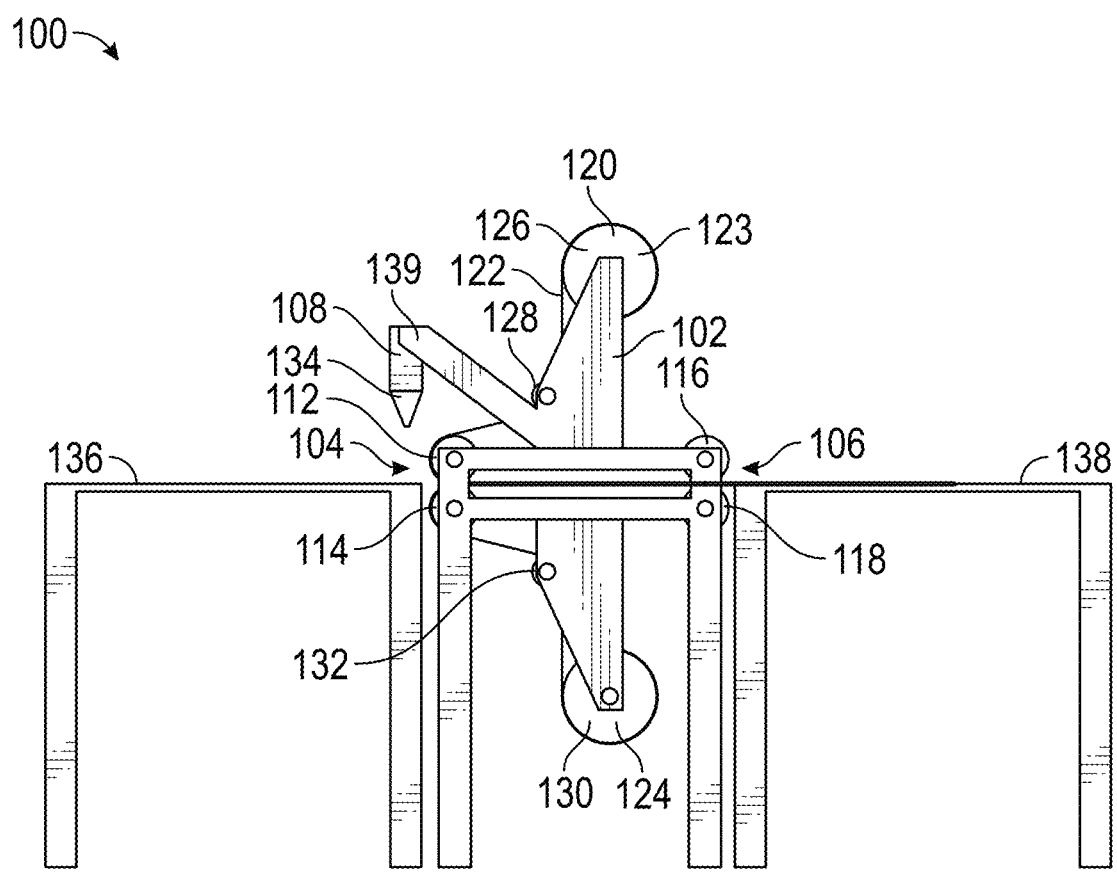
FIG. 2 is a schematic representation of a side view of an apparatus 100 for molding-in gaskets within the grooves of a moving planar work material, in accordance with a non-limiting exemplary embodiment of the present disclosure.

Referring to FIG. 2, it is a schematic representation of a side view of an apparatus 100 for molding-in gaskets within the grooves of a moving planar work material, in accordance with a non-limiting exemplary embodiment of the present disclosure.

Figure 3:
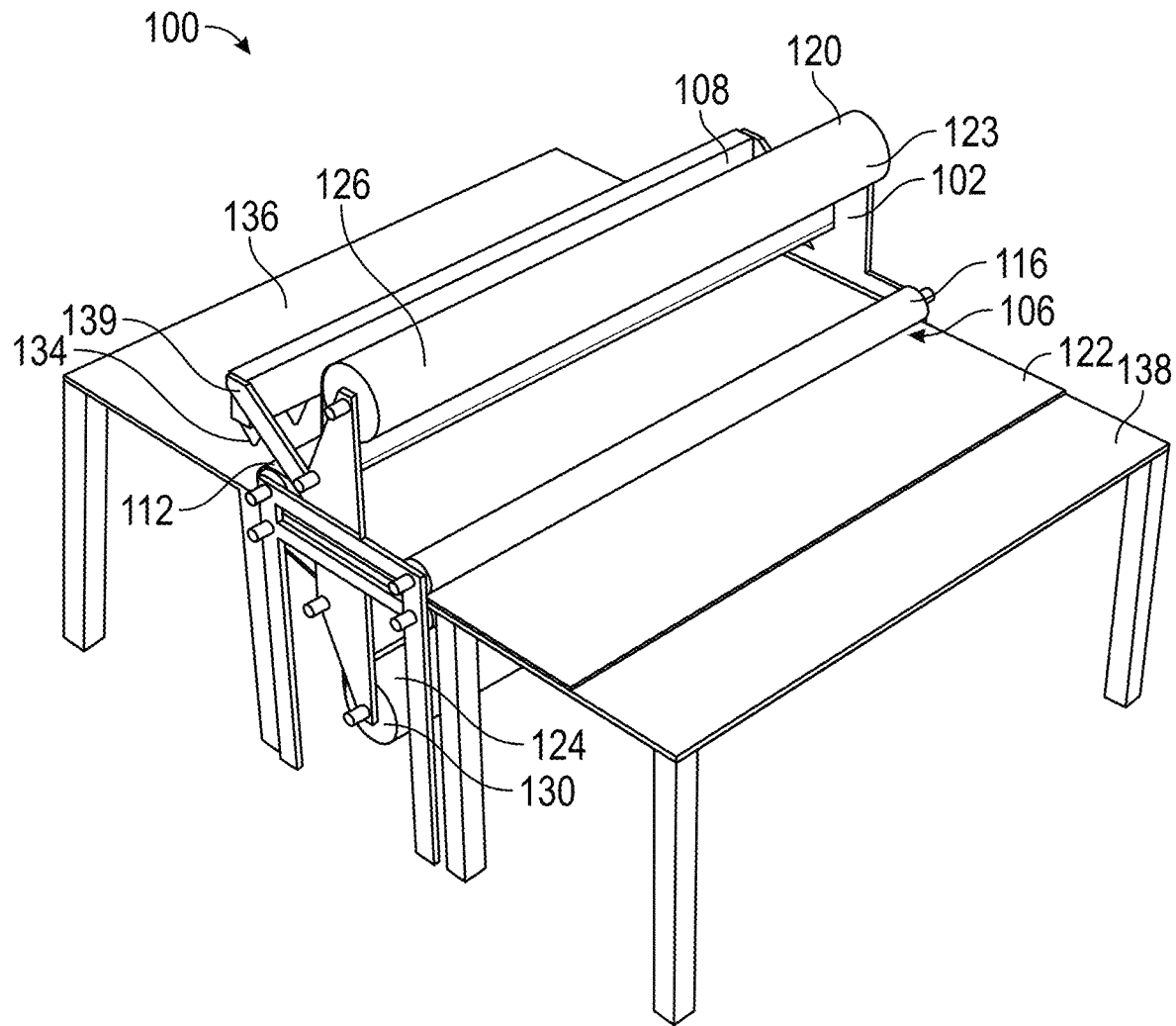
FIG. 3 is a schematic representation of another isometric view of an apparatus 100 for molding-in gaskets within the grooves of a moving planar work material, in accordance with a non-limiting exemplary embodiment of the present disclosure.

Referring to FIG. 3, it is a schematic representation of another isometric view of an apparatus 100 for molding-in gaskets within the grooves of a moving planar work material, in accordance with a non-limiting exemplary embodiment of the present disclosure.

Referring to FIGS. 1 to 3, an apparatus 100 for molding-in gaskets within the grooves of a moving planar work material is disclosed. The apparatus 100 comprises of a frame 102 and a moving means configured to move the planar work material at a regulated speed. The frame has an infeed end 104 disposed at the front and an outfeed end 106 disposed at the back. The frame has a storing means 108 that is configured to store a molten gasket material at a temperature sufficient to keep the hot melt adhesive in a molten form and a dispensing means 110 to dispense the molten gasket material that is in a liquid form onto the top surface of the moving planar work material. In some embodiments, the dispensing means can also serve as the storing means configured to store the gasket material. The frame 102 is configured to hold and drive one or more of elongated, cylindrical compression rollers that are rotatable about an axis. The frame 102 is further configured to store a molten gasket material and subsequently dispense it over a moving planar work material. In a particular embodiment, each of the roller is pivotally mounted on an axially elongated shaft and is rotatably driven. The frame 102 has an infeed end 104 through which the work material is fed into the frame 102 for molding-in gaskets and an outfeed end 106 through which the work material with solidified gaskets comes out. The frame 102 comprises of a pair of front compression rollers at the infeed end 104 and a pair of rear compression rollers at the outfeed end 106, wherein the front compression rollers and the back compression rollers move in a direction advancing the planar work material from the infeed end 104 towards the outfeed end 106. The apparatus 100 further comprises of a driving means to rotatably drive the plurality of rollers. The storing means 108 and the dispensing means 110 are positioned at the infeed end 104 of the frame 102 just in front of the pair of front compression rollers in such a way that the grooves of the moving planar work material are filled with the molten gasket material before the work material passes through the front compression rollers.

In a particular embodiment, the front compression rollers are configured to be at a temperature sufficient to keep the gasket material that is dispensed within the grooves of the moving planar work material in a molten form and to exert enormous pressure over the moving planar work material while rotatably advancing the work material towards the rear compression rollers. The front compression rollers comprise of an upper front compression roller 112 and a lower front compression roller 114 that rotate in opposite directions. The upper front compression roller 112 is positioned above the lower front compression roller 114 and the axes of the rollers are parallel to each other. The gap between the upper and lower front compression rollers is adjusted according to the thickness of the planar work material. The upper and lower front compression rollers are configured to come together at a line of contact during the operation of the apparatus 100. At the line of contact the upper and lower front compression rollers provide an enormous pressure sufficient to flatten and smooth any creases or ridges formed by the excess hot melt adhesive material on the surface of the planar work material and to form an almost 100% planar surface on the work material that passes through that line of contact.

In accordance with a non-limiting exemplary embodiment of the present disclosure, the rear compression rollers are configured to be at a temperature sufficient to keep the gasket material that is dispensed within the grooves of the moving planar work material in a solidified form and to exert enormous pressure over the moving planar work material while rotatably advancing the work material to emerge at the outfeed end 106 of the frame 102. The rear compression rollers comprise of an upper rear compression roller 116 and a lower rear compression roller 118 that rotate in opposite directions. The upper rear compression roller 116 is positioned above the lower rear compression roller 118 and the axes of the rollers are parallel to each other. The gap between the upper and lower rear compression rollers is adjusted according to the thickness of the planar work material. The upper and lower rear compression rollers are configured to come together at a line of contact during the operation of the apparatus 100. At the line of contact the upper and lower rear compression rollers provide an enormous pressure sufficient to flatten and smooth any creases or ridges on the planar work material and to form an almost 100% planar surface on the work material that passes through that line of contact.

The moving means is configured to feed the planar work material having grooves filled-in with molten gasket material at the infeed end 104 of the frame 102 and to receive the emerging planar work material with solidified gaskets at the outfeed end 106 of the frame 102. In a particular embodiment, the moving means comprises of an infeed unit 136 and an outfeed unit 138. In a particular embodiment, the moving means comprises of a conveyor system.

According to a non-limiting exemplary embodiment of the present disclosure, the apparatus 100 further comprises of a foil web dispensing roller unit 120 that is configured to dispense a foil 122 by means of a plurality of rollers and the dispensed foil 122 is configured to cover the moving planar work material on a top surface and a lower surface after the grooves present in the work material are filled with the molten gasket material. In a particular embodiment, each of the roller is pivotally mounted on an axially elongated shaft and is rotatably driven. The dispensed foil web is configured to prevent residues of the gasket material from sticking to the work material and to protect the end product i.e. the work material with solidified gaskets from dust and other foreign substances. The dispensed foil web 122 further protects the pair of front compression rollers as well as the pair of rear compression rollers from gathering residues of the gasket material while advancing the work material having gasket material filled within the grooves through the frame 102 of the apparatus 100. This reduces the wear and tear of the compression rollers thereby increasing their life span.

In accordance with a non-limiting exemplary embodiment of the present disclosure, the foil web dispensing roller unit 120 has an upper unit 123 and a corresponding lower unit 124. The upper unit 123 is configured to hold and rotatably dispense a foil 122 web that covers the top surface of the work material and the lower unit 124 is configured to hold and rotatably dispense a foil 122 web that covers the lower surface of the work material. The upper unit 123 has an upper web roller 126 configured to hold the foil 122 web and dispense it to the upper front compression roller 112 through an upper support roller 128. The lower unit 124 has a lower web roller 130 configured to hold and rotatably dispense a foil 122 web to the lower front compression roller 114 through a lower support roller 132. The upper and lower front compression rollers further dispense the foil 122 over the moving planar work material having grooves filled with the gasket material in such a way so as to cover the work material over both the surfaces with the foil 122 as the work material advances through the compression rollers. The enormous pressure at the line of contact of the pair of front compression rollers and the rear compression rollers ensures that the work material is securely covered by the foil 122. As the planar work material keeps moving, the foil 122 gets dispensed continuously over the work material by the rotating movement of the rollers. According to a particular non-limiting exemplary embodiment of the present disclosure, a silicone coated paper material is used as the foil to cover the planar work material though any other material known in the art can be used that can protect the work material without limiting the scope of the present disclosure.

In accordance with a non-limiting exemplary embodiment of the present disclosure, the storing means 108 is a box-shaped reservoir with an inlet for adding the gasket material into the reservoir and an outlet for dispensing the molten hot melt adhesive material over the moving work material. The outlet of the storing means 108 serves as the dispensing means 110 for dispensing the molten hot melt adhesive material within the grooves of the moving planar work material. The dispensing means 110 is configured to move according to the shape of the groove while dispensing and to dispense the exact quantity of the molten gasket material that is required to fill the grooves. This ensures that the molten gasket material is filled only within the grooves of the moving planar work material with minimal spillage over the surface of the work material. In a particular embodiment, the planar work material is covered with kraft paper sheets on both the surfaces except at the grooves. In such a case, even if the molten gasket material spills over the surface, the work material remains clean when the kraft paper is later removed from the work material. In a particular embodiment, the outlet comprises of one or more nozzles 134 for dispensing the molten gasket material over a work material having a plurality of grooves. The storing means 108 as well as the dispensing means 110 are configured to keep the gasket material in a molten state and are configured to withstand high temperatures. The heating means of the apparatus 100 keeps the molten gasket material in a molten state. In a particular embodiment, the storing means 108 is supported at both the ends by a pair of supporting arms 139 of the frame 102. In a particular embodiment, the heating means is disposed within the dispensing means.

Figure 4:
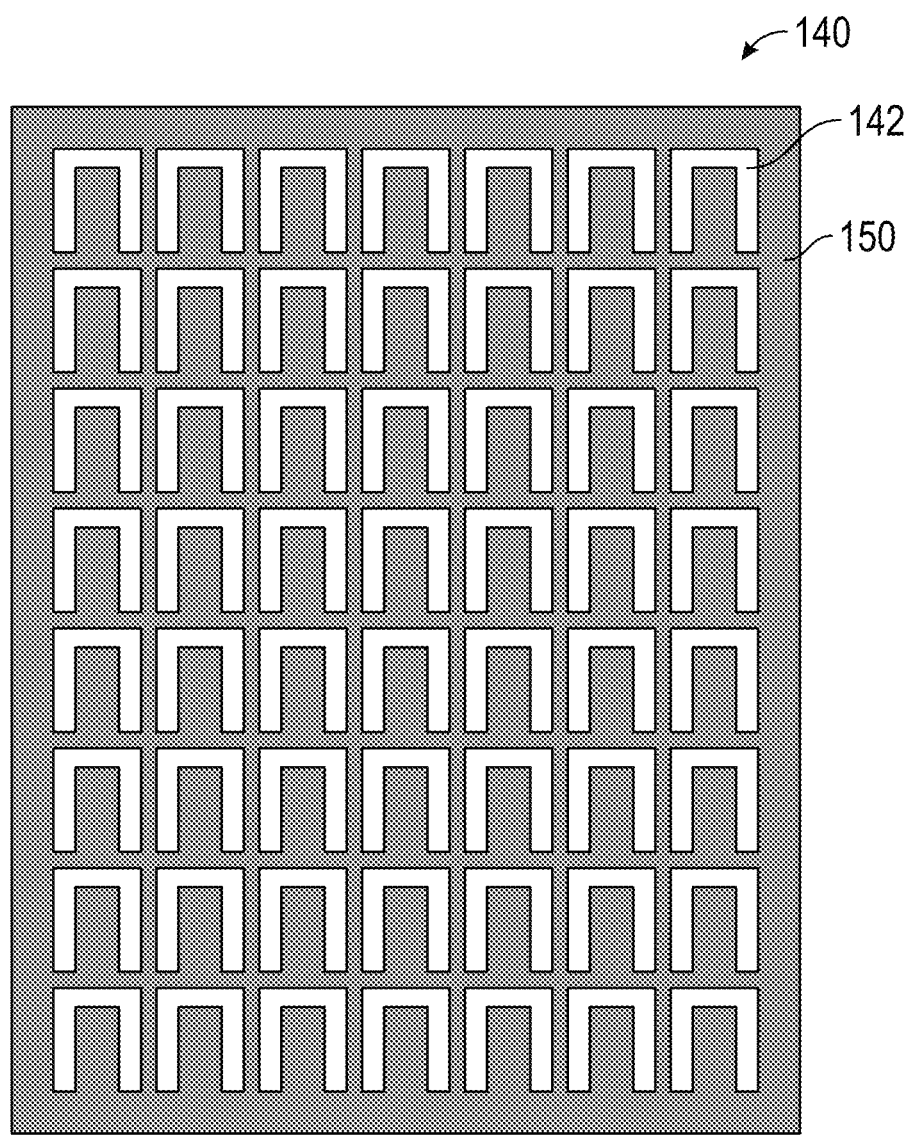
FIG. 4 is a schematic representation of a planar work material 140 having a plurality of grooves, in accordance with a non-limiting exemplary embodiment of the present disclosure.

Referring to FIG. 4, it is a schematic representation of a planar work material 140 having a plurality of grooves 142, in accordance with a non-limiting exemplary embodiment of the present disclosure. The planar work material is covered with kraft paper sheets 150 except at the grooves.

Figure 5:
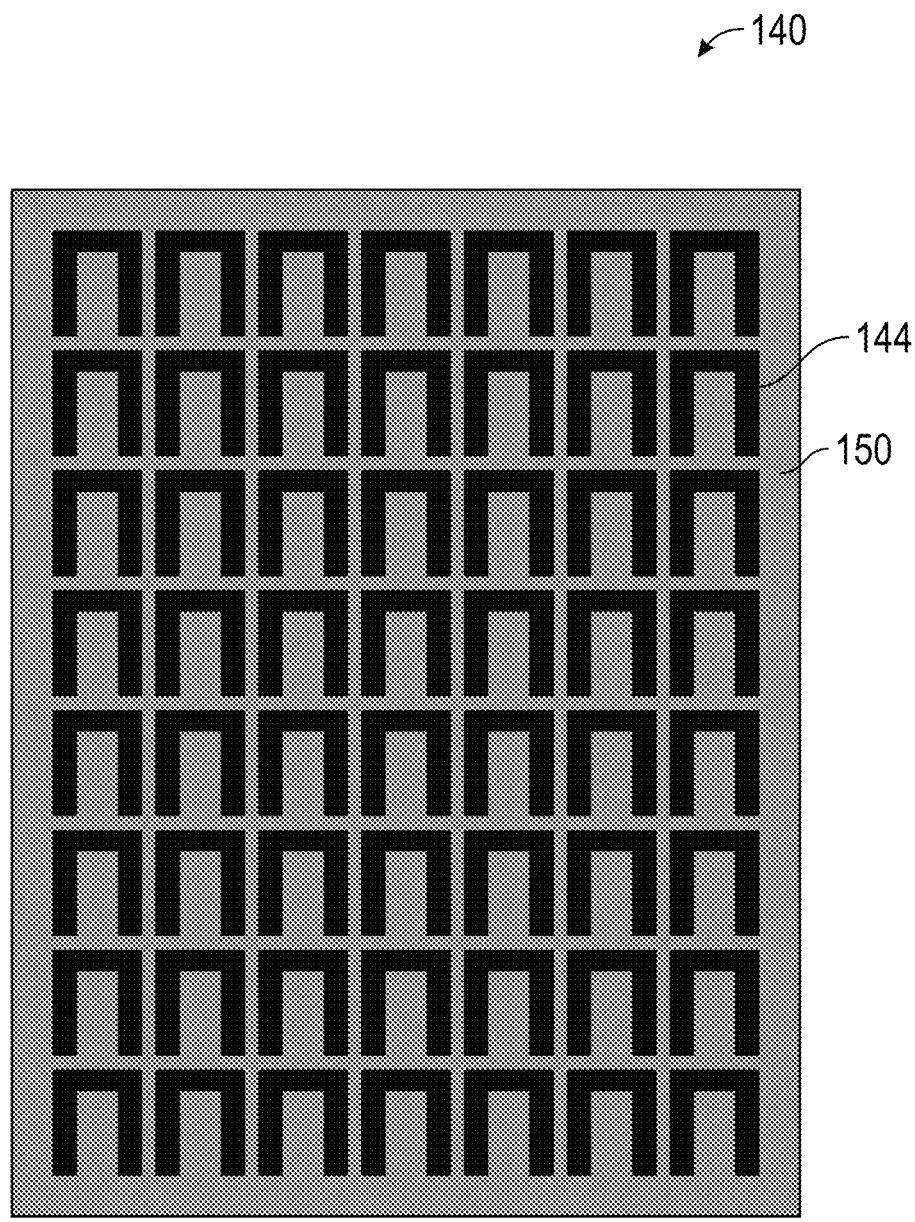
FIG. 5 is a schematic representation of a planar work material 140 having a plurality of grooves with solidified gaskets, in accordance with a non-limiting exemplary embodiment of the present disclosure.

Referring to FIG. 5, it is a schematic representation of a planar work material 140 having a plurality of grooves filled with solidified gaskets 144, in accordance with a non-limiting exemplary embodiment of the present disclosure. According to non-limiting exemplary embodiment of the present disclosure, a planar work material 140 is disclosed, wherein the planar work material 140 comprises of a light panel with at least one of a groove with a solidified gasket 144. The gasket 144 comprises of a hot melt adhesive material that is in a molten state above a particular temperature and gets solidified below a particular temperature. The planar work material is covered with kraft paper sheets 150 except at the grooves.

Figure 6:
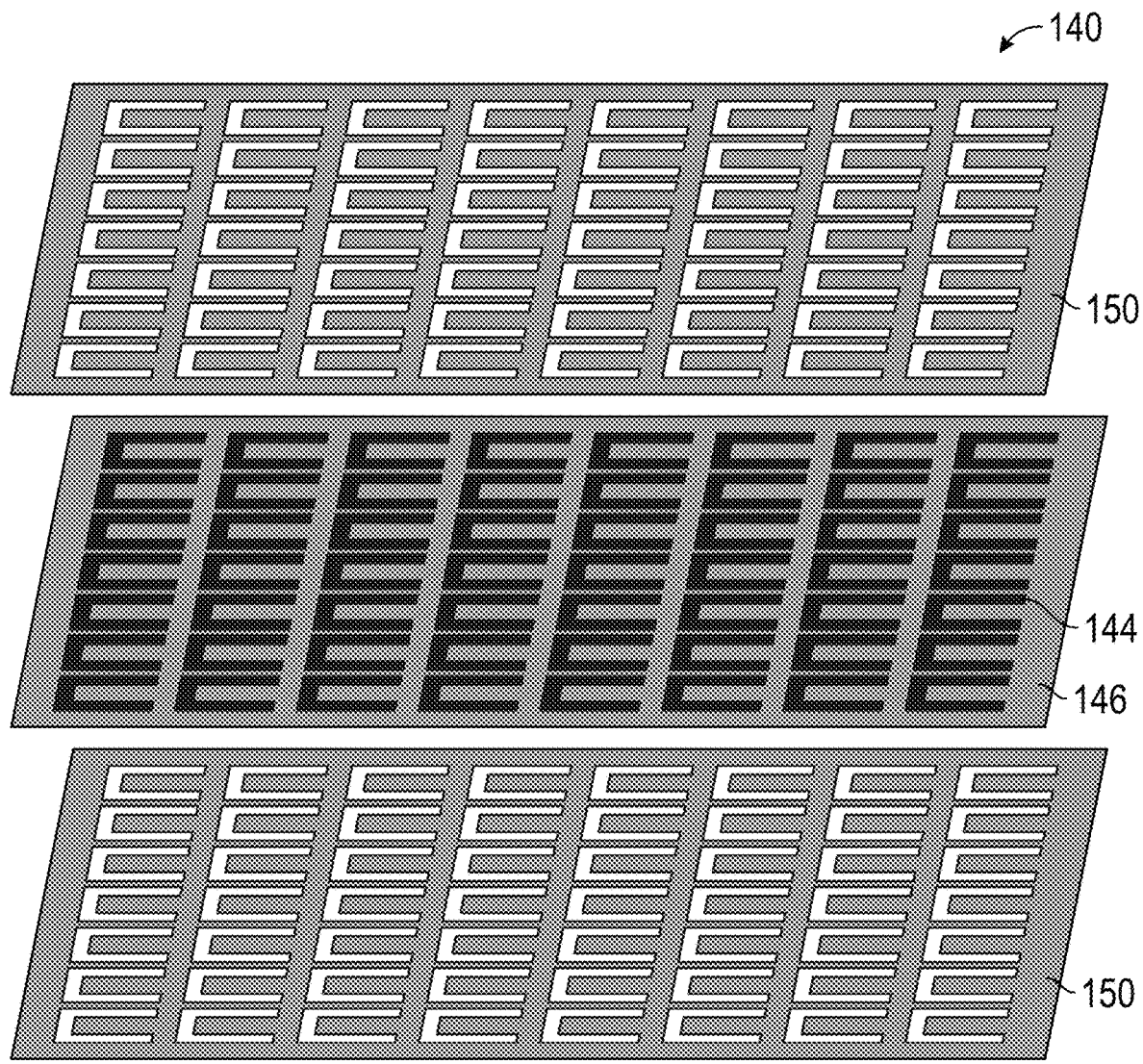
FIG. 6 is a schematic representation of an exploded view of a planar work material 140 having a plurality of grooves with solidified gaskets showing the light panel and the kraft paper sheets, in accordance with a non-limiting exemplary embodiment of the present disclosure.

Referring to FIG. 6, it is a schematic representation of an exploded view of a planar work material 140 having a plurality of grooves with solidified gaskets 144 showing the light panel 146 and the kraft paper sheets 150, in accordance with a non-limiting exemplary embodiment of the present disclosure. In accordance with a non-limiting exemplary embodiment of the present disclosure, a planar work material 140 is disclosed, wherein the planar work material 140 comprises of a light panel 146 with at least one of a groove with a solidified gasket 144, wherein the light panel 146 is affixed with a first kraft paper sheet 150 at a first surface and a second kraft paper sheet 150 at a second surface. The affixed kraft paper sheets 150 are configured to completely cover the light panel 146 except at the grooves that are cut through the light panel 146. The gasket 144 comprises of a hot melt adhesive material that is in a molten state above a particular temperature and gets solidified below a particular temperature. The kraft paper sheets 150 are configured to protect the light panel 146 from scratches and dust. Another advantage provided by the kraft paper sheets 150 is that in case of spillage of the hot melt adhesive material over the surface of the work material 140 during dispensing, the spillage is over the kraft paper sheets 150 only and the light panel 146 is protected by the kraft paper sheets 150. Before using the light panel 146, the kraft paper sheets 150 are peeled off from the surfaces thereby removing the excess hot melt adhesive material.

Figure 7:
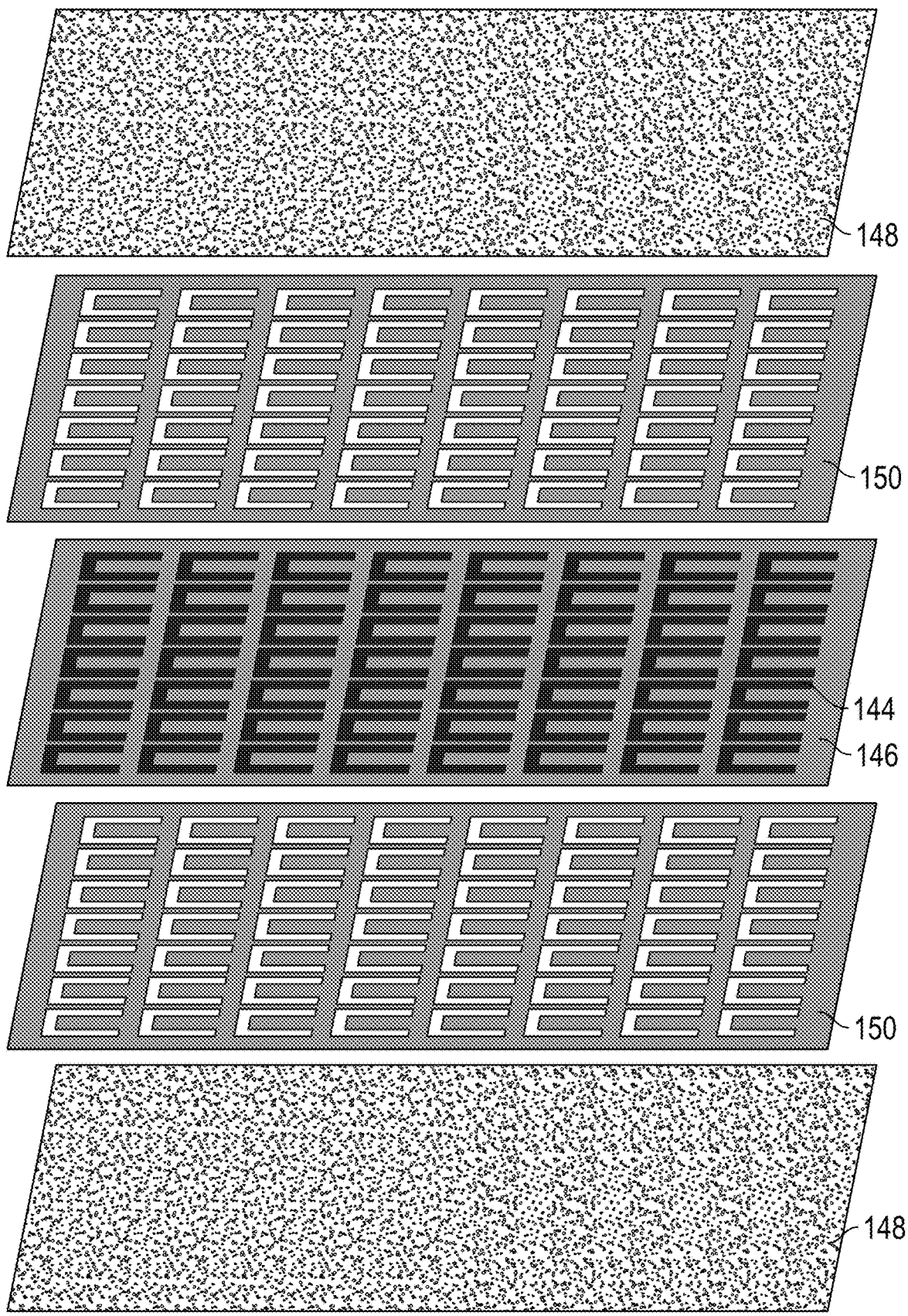
FIG. 7 is a schematic representation of an exploded view of a planar work material 140 having a plurality of grooves with solidified gaskets and covered with silicone coated paper sheets, showing the light panel, kraft paper sheets and silicone coated paper sheets, in accordance with a non-limiting exemplary embodiment of the present disclosure.

Referring to FIG. 7, it is a schematic representation of an exploded view of a planar work material having a plurality of grooves with solidified gaskets 144 and covered with silicone coated paper sheets 148, showing the light panel 146, kraft paper sheets 150 and silicone coated paper sheets 148, in accordance with a non-limiting exemplary embodiment of the present disclosure. In a particular embodiment, the light panel 146 affixed with the kraft paper sheets 150 is further covered with silicone coated paper sheets 148 on both surfaces. The silicone coated paper sheets 148 completely cover the top surface and the lower surface of the light panel 146 affixed with the kraft paper sheets 150 along with the grooves that are filled with molded-in gaskets 144 thus protecting the end product from dust and other foreign material.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

We claim:

1. A device for channeling light from a source for backlighting, the device comprising:
   a plastic panel having a first surface and a second surface opposite the first surface, the plastic panel being formed of a transmissive material for guiding light from the source within the plastic panel;
   at least one groove defined through the plastic panel and having a side wall extending from the first surface to the second surface; and
   at least one gasket, each gasket being located within a corresponding one of the at least one groove within the plastic panel for blocking transmission of the light from the source within the plastic panel, each gasket including a solidified thermal plastic material molded in to the corresponding one of the at least one groove within the side wall, the solidified thermal plastic material being at least partially opaque and including a polymer material that can be dispensed into the at least one groove of the plastic panel in a molten state and that can be solidified within the at least one groove to thereby form the gasket.

2. The device as claimed in claim 1, further including a first masking sheet and a second masking sheet, the first masking sheet being removably affixed to the first surface, and the second masking sheet being removably affixed to the second surface.

3. The device as claimed in claim 2, wherein the first masking sheet and the second masking sheet each define at least one opening, each opening being aligned with one of the at least one groove.

4. The device as claimed in claim 3, wherein each at least one opening is a precut opening.

5. The device as claimed in claim 3, wherein the first masking sheet and the second masking sheet respectively cover all portions of the first surface and the second surface not including one of the at least one groove.

6. The device as claimed in claim 3, wherein the first masking sheet and the second masking sheet each include a kraft paper.

7. The device as claimed in claim 1, further including a first foil and a second foil, the first foil being removably affixed to the plastic panel along the first surface, and the second foil being removably affixed to the plastic panel along the second surface.

8. The device as claimed in claim 7, wherein the first foil and the second foil each include a silicone coated paper.

9. The device as claimed in claim 7, wherein the first foil and the second foil are configured to protect the plastic panel.

10. The device as claimed in claim 1, wherein the solidified thermal plastic material is a hot melt adhesive material.

11. The device as claimed in claim 1, wherein the plastic panel is planar.

12. A device for channeling light from a source for backlighting, the device comprising:
a plastic panel having a first surface and a second surface opposite the first surface, the plastic panel being formed of a transmissive material for guiding light from the source within the plastic element, the plastic panel defining at least one groove extending from the first surface to the second surface through the plastic panel, the at least one groove located within the plastic panel for blocking transmission of the light from the source within the plastic panel; and
at least one gasket, each gasket being located within a corresponding one of the at least one groove, each gasket including a solidified thermal plastic material molded in to the corresponding one of the at least one groove, the solidified thermal plastic material being at least partially opaque and including a polymer material that can be dispensed into the at least one groove of the plastic panel in a molten state and that can be solidified within the at least one groove of the plastic panel to thereby form the gasket.

13. The device as claimed in claim 12, further including a first sheet and a second sheet, the first sheet being removably affixed to the first surface, and the second sheet being removably affixed to the second surface.

14. The device as claimed in claim 13, wherein the first sheet and the second sheet each define at least one opening, each opening being aligned with one of the at least one groove.

15. The device as claimed in claim 14, wherein each at least one opening is a precut opening.

16. The device as claimed in claim 13, wherein the first sheet and the second sheet respectively cover at least all portions of the first surface and the second surface not including one of the at least one groove.

17. The device as claimed in claim 13, wherein the first sheet and the second sheet each include a kraft paper.

18. The device as claimed in claim 13, wherein the first sheet and the second sheet each include a silicone coated paper.

19. The device as claimed in claim 13, wherein the first sheet and the second sheet are configured to protect the first surface and the second surface of the plastic panel.

20. The device as claimed in claim 12, wherein the plastic panel is planar.

21. The device as claimed in claim 12, wherein the solidified thermal plastic material is a hot melt adhesive material.

22. A device for channeling light from a source for backlighting, the comprising:
a plastic panel having a first surface and a second surface opposite the first surface, the plastic panel being formed of a transmissive material for guiding light from the source within the plastic panel;
at least one groove defined through the plastic panel extending from the first surface to the second surface;
at least one gasket, each gasket being located within a corresponding one of the at least one groove within the plastic panel for blocking transmission of the light from the source within the plastic panel, each gasket including a solidified thermal plastic material molded in to and filling the corresponding one of the at least one groove, the solidified thermal plastic material being at least partially opaque and including a polymer material that can be dispensed into the at least one groove of the plastic panel in a molten state and that can be solidified within the at least one groove of the plastic panel to thereby form the gasket; and
a first sheet and a second sheet, the first sheet being removably affixed to the first surface, and the second sheet being removably affixed to the second surface.

23. The device as claimed in claim 22, wherein at least the first sheet includes a first masking sheet defining at least one opening, each opening being aligned with one of the at least one groove.

24. The device as claimed in claim 23, wherein each at least one opening is a precut opening.

25. The device as claimed in claim 23, wherein the first sheet and the second sheet respectively cover all portions of the first surface and the second surface not including one of the at least one groove.

26. The device as claimed in claim 22, wherein at least the first sheet includes a first foil.

27. The device as claimed in claim 22, wherein the first sheet and the second sheet each include one of a kraft paper and a silicone coated paper.

28. A device for channeling light from a source for backlighting comprising:
a plastic panel having a first surface and a second surface opposite the first surface, the plastic panel being formed of a transmissive material for guiding light from the source within the plastic element, the plastic panel defining at least groove extending from the first surface to the second surface through the plastic panel, the at least one groove located within the plastic panel for blocking transmission of the light from the source within the plastic panel;

at least one gasket, each gasket being located within a corresponding one of the at least one groove, each gasket including a solidified thermal plastic material molded in to the corresponding one of the at least one groove; and a first sheet and a second sheet, the first sheet being removably affixed to the first surface, and the second sheet being removably affixed to the second surface, the first sheet and the second sheet each defining at least one opening, each opening being aligned with one of the at least one groove.

29. The device as claimed in claim 28, wherein the first sheet and the second sheet respectively cover at least all portions of the first surface and the second surface not including one of the at least one groove.

30. The device as claimed in claim 28, wherein the first sheet and the second sheet are configured to protect the first surface and the second surface of the plastic panel.

* * * * *